J. C. BENSON.
SEED CLEANER AND GRAIN SEPARATOR.
APPLICATION FILED MAY 15, 1911.

1,002,555.

Patented Sept. 5, 1911.

3 SHEETS—SHEET 1.

WITNESSES:
Hayward Woodard
Robert M. Granwell

INVENTOR
James C. Benson
BY
Fred G. Dieterich & Co.
ATTORNEYS

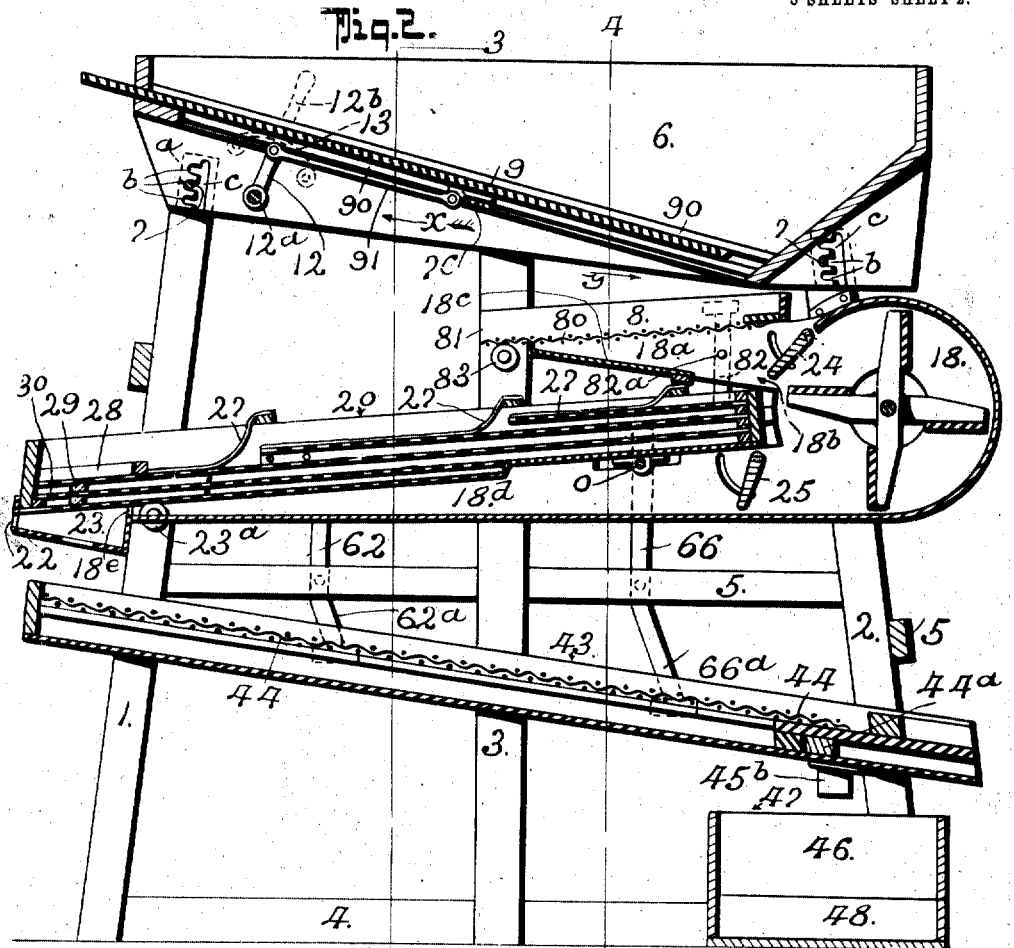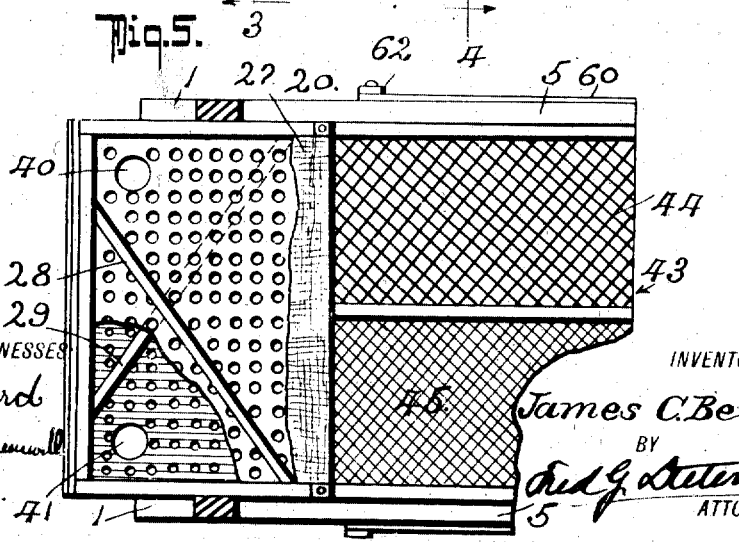

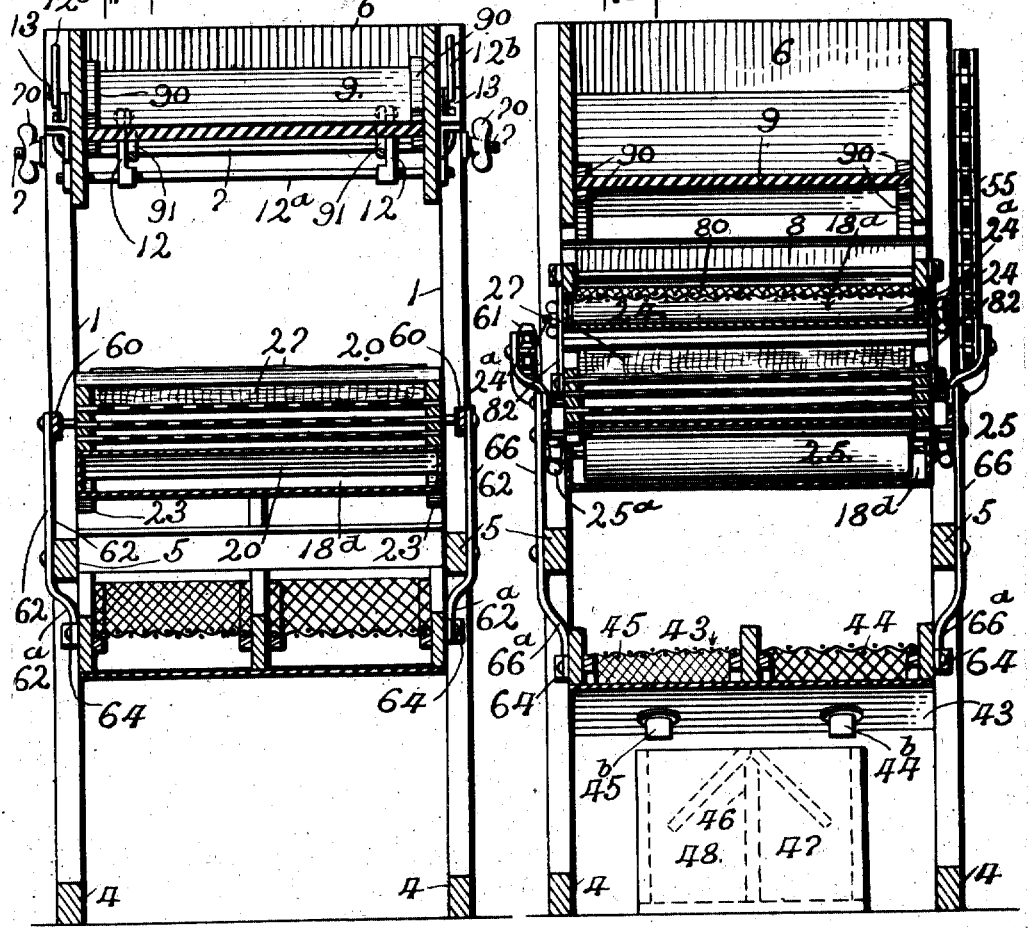
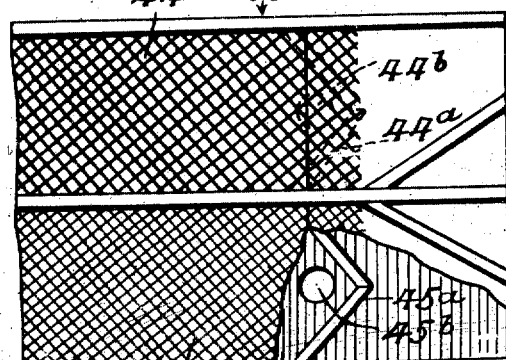

UNITED STATES PATENT OFFICE.

JAMES C. BENSON, OF TROY, OHIO.

SEED-CLEANER AND GRAIN-SEPARATOR.

1,002,555. Specification of Letters Patent. Patented Sept. 5, 1911.

Application filed May 15, 1911. Serial No. 627,094.

*To all whom it may concern:*

Be it known that I, JAMES C. BENSON, residing at Troy, in the county of Miami and State of Ohio, have invented a new and Improved Seed-Cleaner and Grain-Separator, of which the following is a specification.

This invention primarily has for its object to provide a seed cleaner and grain separating machine of a simple and economical construction, and in which the several parts are coöperatively so combined and arranged for effecting a proper and desired cleaning and distribution of the cleaned seed, and the said parts are especially designed for being easily put up and maintained for their practical operation.

My present invention has for its object to provide an improved and simpified means for agitating and vibrating the several screen carrying frames or shoes, and for adjustably mounting the hopper with its adjustable feed board.

Again, my present invention embodies a novel and improved mounting of the main or separating screens and carrier therefor and the final screening devices.

Figure 1:
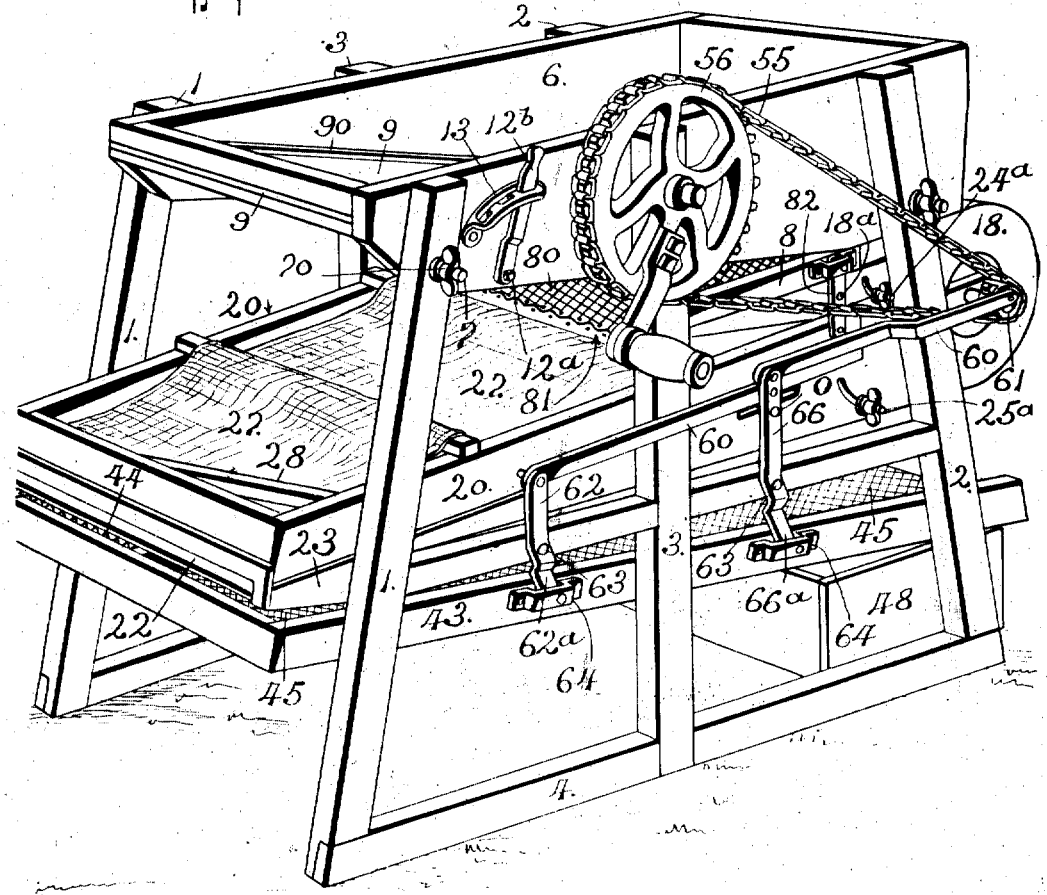
Figure 7:
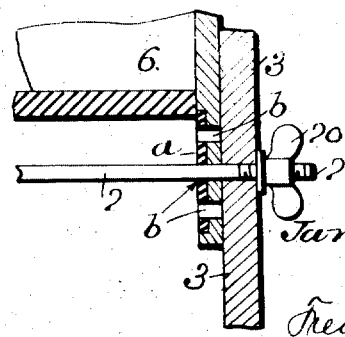

My invention further seeks to provide an improved means for directing the fan blasts for effecting a positive and quick separation of the chaff and trash from the grain and with other objects in view that will hereinafter appear my said present invention consists in the peculiar construction and novel combination of parts all of which will be hereinafter fully explained, be specifically pointed out in the appended claims, and illustrated in the accompanying drawings, in which:

Figure 1, is a perspective view of the invention. Fig. 2, is a vertical longitudinal section thereof. Fig. 3, is a transverse section taken substantially on the line 3—3 on Fig. 2. Fig. 4, is a similar view on the line 4—4 on Fig. 2. Fig. 5, is a plan view of the delivery end of the central screen carrying shoe, parts being broken away, to show parts of the bottom shoe screen. Fig. 6, is a similar view of the discharging end of the lower screen carrying shoe. Fig. 7, is a detail cross section of one of the hopper adjusting devices hereinafter referred to of Fig. 2.

In the practical arrangement my present invention includes a supporting frame comprising the front and rear pairs of end legs 1—1—2—2, the central pair of uprights or legs 3—3, braced by the base members 4—4 and one or more sets of horizontal brace bars 5—5.

6 designates the hopper that is mounted between the upper ends of the legs or standards 1—3 and in the construction shown the said hopper is adjustably mounted relatively to the upper or chaff shoe 8, so that the throat or discharge between the hopper and the receiving end of the said chaff shoe may be readily regulated to suit the character of the seed to be cleaned and separated. For effecting the adjustability of the hopper, I prefer to use the means, best shown in Figs. 1 and 2, by reference to which it will be seen the hopper is held clamped between the upper ends of the standards 1 and 2, by cross rods 7—7, the ends of which are threaded to receive the winged nuts 70—70 that engage the standards 1 and 2, it being obvious that by tightening the said nuts the hopper can be fixedly and firmly held in the desired position. The hopper at each end and at opposite sides has a pair of bracket irons $a$ having stepped bearings $b$, that merge with the vertical slots $c$, the said slots and bearings having such relation that any one of the set of bearings $a$ can be slid onto the clamping rods 7, it being clear that to effect the desired adjustment of the hopper it is only necessary to first shift the said hopper bodily in the direction indicated by the arrow $x$, and then raise or lower it to the position desired and then shift the said hopper body bodily in the direction of the arrow $y$, to bring the desired ones of the bearings $a$ into engagement with the rods 7, after which the winged nuts on the rods are screwed home to clamp the hopper to its set position.

9 designates the slide gate in the bottom of the hopper which rides between the guide cleats 90—and near the lower end and on the under side it has bearings 7$^c$ with which join the link rods 91 that extend upwardly under the slide gate 9 and pivotally engage cranks 12 that extend from a rock shaft 12$^a$ mounted in the pendent sides of the hopper and whose outer ends have levers 12$^b$ for engaging rack guides 13—13. By reason of the construction shown and described a simple and inexpensive and single means is provided for clamping and holding the hopper in a fixed position and for shifting its discharge end with respect to the upper chaff shoe.

The upper chaff shoe 8 in my present invention is shown with a single coarse screen 80 mounted in the lower edge of the box frame 81, the inner or head end of which is supported by the oscillating bars 82—82 fulcrumed at 82ª on the sides of the extension or nozzle end 18ª of the fan casing 18, the outer or nose end of which stops under the delivery end of the screen 80 which is loosely mounted and oscillates on the roller bearings 83—83.

20 designates the intermediate combined chaff and separating shoe the receiving end of which extends up to near the fan chamber proper and directly under the delivery opening 18ᵇ of the nozzle end of the fan chamber, the bottom 18ᶜ of which takes the droppings through the upper chaff screen and delivers them onto the intermediate screens, as is best shown in Fig. 2, by reference to which it will be noticed the fan chamber includes a lower or supplemental extension 18ᵈ that extends under and nearly the full length of the intermediate shoe, the outer or nozzle end 18ᵉ stopping just in advance of the delivery ends of the several screens forming a part of the said intermediate shoe, whereby to direct the blast directly under the said delivery end to blow out the chaff and other light particles that pass through and from the intermediate shoe screen through the outlet 22 in the supplemental or collecting pocket 23 that extends transversely under the front end of the intermediate shoe that inclines downwardly and rearwardly and whose inner end is open whereby to direct the droppings into the said pocket 23 on the lower or final separating and cleaning shoe, presently fully described.

It will be noticed by again referring to Fig. 2, the bottom of the intermediate shoe is closed to a point near the forward or nose end of the blast chamber 18ᵉ such arrangement providing for a concentrated blast through the pocket and up through the screens in the delivery end of the intermediate shoe that insures the positive blowing off of the chaff at the said delivery end, it being understood that the upper nozzle portion of the fan chamber acts in a like manner for separating the chaff from the grain that pours over the upper or coarse screen. By placing the receiving end of the shoe 20 near the fan chamber proper, a simple and effective means is provided for dividing and directing the blast in the manner stated and it also provides, as it were, two distinct air passages, one above and the other below the shoe 20, and of such form that the force and direction of the blast through either passage can be readily regulated by the upper and lower wind boards 24—25, that are adjusted by the set screws 24ª—25ª in the usual manner.

In my present invention, the intermediate shoe has a series of screens each set of which comprises a plurality of independent screening surfaces and these are of zinc, having graded apertures, the two upper sets of screens in practice having the largest apertures for separating the big from the little seed, while the second set of screens are of such mesh that they separate the cockle from the little grains. For separating the oats from wheat, each set or series of the zinc screens is provided with the loosely held flexible, preferably, oil-cloth curtain 27, under which the long grain seed work while the larger or round seed passes thereover, in the manner well known to those skilled in this art.

The delivery end of the shoe 20 has a check board or strip 28, and the delivery end of the upper and lower set of the screens have diagonally disposed guide strips 29—30 for deflecting the separations to the oppositely disposed outlets 40—41, one of which is for the larger seed and the other for the smaller seed separations, the separations that pass through the lowermost screen of the last set and the droppings that go into the pocket passing out of the pocket into the small mesh screen of the lower shoe 50. The shoe 20 at the upper end is hung on the lower end of the hanger bars C, and its lower or discharging end is held on roller bearings 23—23.

60—60 designate link rods one end of which is eccentrically connected to the sprocket wheels 61—61, on the fan shaft, their outer ends being pivotally connected to the upper ends of oscillating levers 62—62 fulcrumed on a stud rod 63 and whose lower ends are pivotally mounted in the brackets 64 on the elevated end of the lower shoe 43, again referred to. The levers or hangers 62—66 are fulcrumed on the horizontal beams of the main frame, and both sets of the said levers are crank-shaped and their lower or crank ends 62ª—66ª extend forwardly in the direction of the discharging end of the lower shoe 43 to which the said ends 62ª—66ª are pivotally connected, as best shown in Fig. 1. The lower shoe 43 which is loosely held on the hanger levers to swing in the direction of its length has two wire screens 44—45 of different mesh whereby to maintain the proper separation of the different grades of grain that pass down from the middle shoe and the grain that passes down through the said two screens 44—45 is trapped by the strip flanges 44ª—45ª, so as to pass out through the openings 44ᵇ—45ᵇ, onto a divided partition 46 that leads the seeds into the receivers 47—48, it being understood that the good seed pass off the end of the screens 44—45.

The fan is driven by the endless chain 55 that takes over the cranked sprocket wheel 56.

From the foregoing description taken in connection with the accompanying drawings the complete construction, the operation and the advantages of my present invention will be apparent to those skilled in the art to which this invention relates.

By reason of mounting the three shoes as shown and described a simple and effective means is provided for imparting the required constant agitation to the said shoes and their screens, the crank formation of the hangers serving to impart a lift-jump-action to the lowermost shoe and its screens which causes the seed thereon to be constantly jarred upwardly from the lower screen and thereby effect a perfect separation of the good from the foul seed. The dust chaff, and other light rubbish is positively blown out of the grain before it gets down onto the bottom shoe, and screens, the two sets of blast nozzles arranged as shown and described serving to blow off small sticks, weed seeds and other light trash and in such manner that the proper screening and separation of the seed is materially assisted.

What I claim is:

1. In a machine of the character described, the combination with the supporting frame, of a hopper mounted in the upper end thereof, a chaff shoe that receives from the hopper, and a plurality of separating shoes onto which the chaff shoe discharges, a blast fan and a fan casing, the latter having a plurality of discharging nozzles, a wind board for each nozzle, a driven wheel on the fan shaft, connections between said driven wheel and the shoes for vibrating the said shoes, and means for directing the separated seed from one shoe onto another shoe.

2. In a machine of the character described, the combination with the supporting frame, of a hopper mounted in the upper end thereof, a chaff shoe that receives from and a plurality of separating shoes onto which the chaff shoe delivers, a blast fan and a fan casing, the latter having a plurality of discharging nozzles, a wind board for each nozzle, a driven wheel on the fan shaft, connections between said driven wheel and the shoes for vibrating the said shoes, and means for directing the separated seed from one shoe onto another shoe.

3. In a machine of the class described, the combination with a suitable supporting frame, a hopper mounted on the upper end thereof, the blast fan and casing and the driving power mounted on the frame geared with the blast fan; of a chaff shoe that receives the discharge from the hopper, said shoe being loosely sustained at its delivery end for longitudinal movement, a pair of rocker levers fulcrumed in the main frame and vertically disposed relatively to the said frame, link bars pivotally connected to the upper ends of the said rocker levers, and eccentrically joined with the fan chaff driver, rocker members mounted on the fan casing having their upper ends pivotally connected to the chaff shoe and their lower ends pivotally joined to the aforesaid link bars, an intermediate shaker shoe loosely mounted at one end for longitudinal reciprocation, the other end being connected to one set of the aforesaid rocker levers, and a lower or bottom shoe on the lower ends of the said rock levers.

JAMES C. BENSON.

Witnesses:
FLORENCE L. DeFREES,
W. LEO BANSMAN.